United States Patent [19]
Hamma

[11] Patent Number: 5,438,874
[45] Date of Patent: Aug. 8, 1995

[54] PRESSURE MEASURING INSTRUMENTS

[76] Inventor: John Hamma, 23 Sunnyside Ct., Milford, Conn. 06460

[21] Appl. No.: 214,497

[22] Filed: Mar. 18, 1994

[51] Int. Cl.⁶ .............................................. G01L 1/04
[52] U.S. Cl. ........................................ 73/715; 73/700; 73/708
[58] Field of Search ................ 73/700, 711, 715, 742, 73/743, 708, 725

[56] References Cited
U.S. PATENT DOCUMENTS

| | | | |
|---|---|---|---|
| 4,107,996 | 8/1978 | Hollingsworth et al. | 73/715 |
| 4,807,478 | 2/1989 | Betterton et al. | 73/725 |
| 4,947,150 | 8/1990 | Wasserstrom | 73/715 |

*Primary Examiner*—Richard E. Chilcot, Jr.
*Assistant Examiner*—Max H. Noori
*Attorney, Agent, or Firm*—Melvin I. Stoltz

[57] ABSTRACT

By providing a captured roller construction as the movement assembly for a sensing element, a low cost, accurate, measuring instrument is achieved. In the present invention, the movement of the sensing element causes the movement assembly to produce rotational motion in direct response thereto. As a result, any change in the level of the source condition being monitored is immediately indicated on a visual readout, due to the responsive rotational motion of the movement assembly. By employing captured rollers as the principal means for attaining rotational motion, an easily constructed, dependable, low cost movement assembly and measuring instrument construction is realized.

18 Claims, 4 Drawing Sheets

PRESSURE MEASURING INSTRUMENTS

TECHNICAL FIELD

This invention relates to measuring instruments and, more particularly, to instruments for measuring and displaying conditions such as pressure, temperature, humidity and the like.

BACKGROUND ART

Measuring instruments arc well known and commonly used to measure and monitor various conditions such as temperature, pressure, humidity, and the like of a particular source or product. Typically, a measuring instrument includes a sensing clement, a movement, and an indicator. In order to operate effectively and provide the desired result, the movement usually must perform the following two functions: (1) amplification of the motion of the sensing clement, and (2) conversion of the sensing element's motion to angular motion. In addition, the movement assembly often must also be able to convert the motion of the sensing element into angular motion which is in a plane perpendicular to the direction of the sensing element's motion.

Measuring instruments have long been used in a wide variety of applications, due to the need and desire to measure and/or monitor various conditions or levels of certain products, areas, or test equipment. With the ever increasing expansion of both products and processes, the need for such measuring instruments has continued to increase.

Typical prior art measuring instruments are employed to measure or monitor the pressure, temperature, humidity, etc of a particular source, product, or zone. Although all prior art measuring instruments are constructed for measuring one particular condition, measuring instruments generally comprise a similar construction, as discussed above. As a result, one type of measuring instrument, namely a pressure gauge, has been selected for detailed discussion herein as an example of all measuring instruments.

High quality pressure measuring gauges arc principally constructed using sealed elongated tube members as the sensing element. By employing a specially constructed movement assembly, the movement of the sealed elongated tube controls a movable indicator, and the pressure change sensed by the tube is converted to a readable dial which displays the pressure level. Although these gauges provide accurate measuring of desired pressure levels, these prior art gauges are extremely expensive since the formation of sealed tubes capable of attaining this uniform deflection represents a complex and difficult art.

Another type of sensing element employed in pressure gauges is the diaphragm. By exposing one side of a sealed diaphragm to the pressure source, the diaphragm moves along its central axis in response to pressure changes. By measuring the deflection of the diaphragm as its movement varies in response to the pressure being monitored, desired pressure levels and changes are measured and monitored.

Although the use of a diaphragm is substantially less expensive than the sealed tube prior art gauges, diaphragms suffer from three principal shortcomings: (1) movement is small in response to pressure changes; (2) movement is not linearly proportional to pressure changes; and (3) movement is perpendicular to the plane of the gauge dial. As a result, the movement assembly must be constructed to accommodate the shortcomings.

Although consumer demand has long existed for inexpensive pressure measuring/monitoring gauges capable of providing accurate results in a long-term and consistent manner, the industry has only been capable of satisfying this need by providing pressure measuring/monitoring gauges having complex mechanisms which are expensive to produce and assemble. As a result, the resulting products arc incapable of satisfying the ever-increasing need for low cost, reasonably accurate pressure gauges, as well as low cost reasonably accurate measuring instruments in general.

Therefore, it is a principal object of the present invention to provide a measuring instrument which is capable of being produced inexpensively, while also providing accurate results.

Another object of the present invention is to provide a measuring instrument having the characteristic features described above which is capable of being employed in virtually any desired application while providing consistent and repeatable results.

Another object of the present invention is to provide a measuring instrument having the characteristic features described above which employs a minimum of components and, as a result, is capable of being easily and quickly assembled.

Other and more specific objects will in part be obvious and will in part appear hereinafter.

SUMMARY OF THE INVENTION

By employing the present invention, the difficulties and drawbacks which have plagued the prior art have been completely eliminated and a low cost, accurate, measuring instrument is achieved. In the present invention, by employing a unique, compact, easily-constructed, interface or movement assembly between the sensing clement and the output indicator, the prior art failings have been overcome.

In accordance with the present invention, the movement or interface assembly comprises a captured roller assembly wherein movement of the sensing element causes the interface or movement assembly to produce rotational movement in direct response thereto. In this way, any change in the level of the condition being monitored is immediately indicated on the visual readout, due to the responsive rotational movement of the interface or movement assembly.

In the preferred embodiment of the present invention for use in a pressure measuring/monitoring gauge which incorporates a diaphragm as the sensing element, the movement or interface assembly comprises a support plate which incorporates an upstanding post extending from one surface thereof. The opposed surface of the support plate is positioned in juxtaposed, spaced, cooperating relationship with the diaphragm, using a low-friction bearing member positioned therebetween.

In the preferred embodiment, the support plate incorporates a plurality of independent segments, each of which incorporate a separate and independent ramped track or groove formed therein within which rollers or bearing means are mounted for controlled movement. In order to maintain the rollers or bearing means in the desired position within the track, a bearing holding spider is mounted in juxtaposed, spaced, cooperating relationship with the support plate and the upstanding post thereof.

The assembly of the pressure level measuring and monitoring interface is completed by incorporating a covering plate or keeper in juxtaposed, spaced, facing relationship with the support plate and in overlying contacting engagement with the bearings. In addition, biasing spring means are also mounted over the cover plate in controlling engagement with the upstanding post. In this way, contacting engagement of the support plate and bearing member with the diaphragm is assured regardless of the direction in which the system is rotated.

By employing this simple, low-cost, easily manufactured and assembled construction, a highly accurate, consistent, and dependable pressure level measuring and monitoring interface/movement assembly is attained. As detailed herein, this interface/movement assembly is capable of converting the axial movement of the diaphragm into a visual readout, so as to provide the user with an indication of the pressure level for the particular medium being monitored or measured as well as any changes that occur to the pressure level.

In operation, any change in the pressure level of the material being monitored or measured causes the diaphragm to be axially deflected. With the low friction bearing member interposed between the support plate and the diaphragm, the axial movement of the diaphragm is transmitted through the low friction bearing to the support plate of the interface assembly.

This axial force attempts to move the support plate against the bearings and the keeper or cover plate in an attempt to cause these components to move in the same direction and to the same extent. However, with the cover plate securely affixed to the gauge assembly and incapable of axial movement, the forces acting upon the support plate and the ball bearings cause the support plate to rotate as the ball bearings roll in the ramped slots formed in the support plate. Depending upon the level of the pressure change which was monitored, this rotational movement can be very slight or substantial. However, regardless of the amount of rotational movement produced, any change in the diaphragm causes the support plate to rotate to a substantially greater extent, as the ball bearings contained in the tracks formed in the support plate are forced to rollingly advance along the slope of the track, causing the support plate to rotate in its entirety.

As the support plate rotates, the upstanding post associated therewith also rotates causing the biasing spring attached thereto to be compressed further, maintaining a return force on the post and support plate. In addition, a pointer is affixed to the terminating end of the support post and is moved in direct response to the pressure level change which has been detected and has caused the support plate and post to rotate. By positioning the pointer in association with desired markings, the pressure change measured and/or monitored by the interface assembly can be easily observed by the user. It should be noted that the balls roll in the tracks and that rolling friction is extremely small as compared to sliding friction.

By employing this construction, a highly sensitive, accurate, low-cost pressure measuring/monitoring gauge is realized and all of the prior art failings are overcome. By employing the interface/movement assembly of this invention with this simple, easily-manufactured construction, accurate pressure level changes can be measured and monitored and gauge assemblies previously incapable of being realized are attained.

A major advantage of this invention which is not obvious, is the ease by which non-linearities in the diaphragm's response to pressure changes can be canceled out. By shaping the slope of the tracks properly, which is easily done by conventional manufacturing techniques, the output of the gauge can be made substantially linear even though the diaphragm's response is non-linear. If desired, the output could be made intentionally non-linear such as in an expanded mid-range construction. Furthermore, it is also easy to change the sensitivity of the gauge by merely changing the slope of the tracks.

Although the construction of the present invention has been detailed for use in a pressure gauge, the interface/movement assembly of this invention is employable in all measuring instruments with equal efficacy. Consequently, the scope of this invention is intended to encompass all measuring instruments.

The invention accordingly comprises the features of construction, combinations of elements, and arrangement of parts which will be exemplified in the constructions hereinafter set forth, and the scope of the invention will be indicated in the claims.

THE DRAWINGS

For a fuller understanding of the nature and objects of the present invention, reference should be had to the following detailed disclosure taken in connection with the accompanying drawings in which.

DETAILED DESCRIPTION

Figure 1:
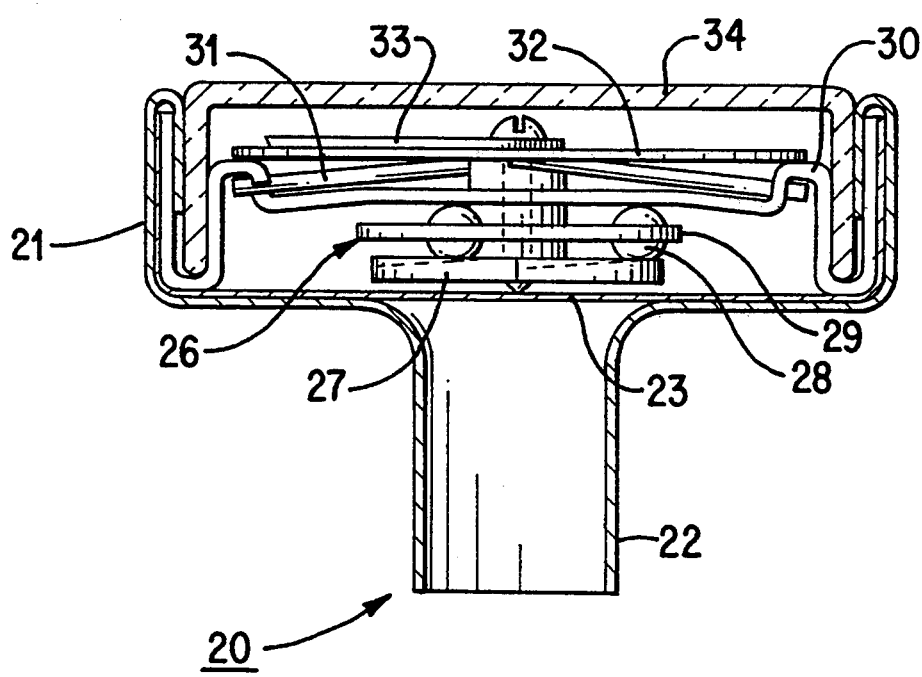
FIG. 1 is a cross-sectional side elevation view of the preferred embodiment of the interface/movement assembly of the present invention mounted in a pressure measuring/monitoring gauge.
Figure 2:
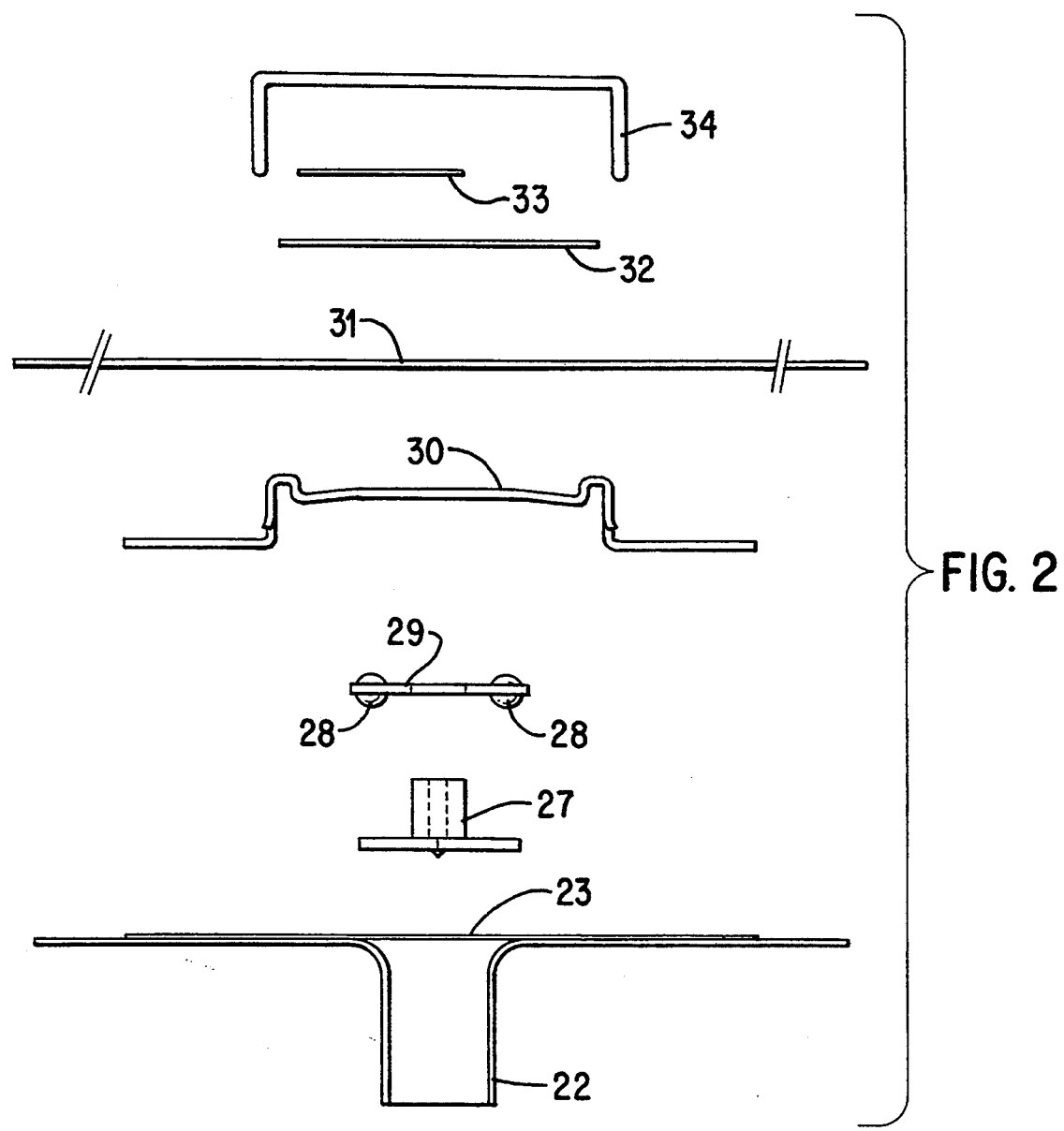
FIG. 2 is an exploded side elevation view of the components forming the gauge of FIG. 1.

By referring to FIGS. 1–5, along with the following detailed disclosure, the preferred construction of a measuring instrument made in accordance with the present invention can best be understood. As is evident to one of ordinary skill in the art from this disclosure, the measuring instrument of the present invention can be manufactured in a plurality of alternate embodiments without departing from the scope of the present invention. For exemplary purposes only and not intending to be limited thereto, the following detailed disclosure and drawings discuss the construction of a pressure measuring and monitoring gauge which incorporates the interface/movement assembly of this invention. However, it is to be understood that the detailed disclosure of a pressure gauge is for exemplary purposes only. Although this particular embodiment is depicted and discussed herein, the disclosure of this sole embodiment is not intended to limit the scope of the present invention thereto and all sensing instruments which can be made in accordance with this invention are also included herein.

In the preferred embodiment depicted in FIGS. 1-5 for a pressure monitoring/measuring gauge, gauge 20 incorporates a housing 21 to which is mounted pressure level input fitting 22. By connecting input fitting 22 to the particular material or area being measured, the desired pressure level is continuously delivered to housing 21 for being measured by gauge 20.

In order to provide the principal pressure level sensing function, diaphragm 23 is mounted in housing 21 in direct overlying association with an inlet pressure fitting 22. By positioning diaphragm 23 in overlying association with input pressure fitting 22, diaphragm 23 is capable of monitoring and measuring the pressure level in fitting 22.

In order to provide the requisite means for monitoring the movement of diaphragm 23 and produce a visual indication representative of the diaphragm's movement, pressure monitoring/measuring gauge 20 of the present invention incorporates movement or interface assembly 26. By referring to FIGS. 1 and 2 along with the following detailed discussion, the components forming movement or interface assembly 26 can best be understood, as well as the low-cost, easily manufacturable, efficient and easily assembled construction attained by movement/interface assembly 26.

In the preferred embodiment, movement/interface assembly 26 incorporates a spinner or rotatable member 27, a plurality of spherical balls or bearings 28, a bearing holding and controlling spider 29, a cover plate 30, and spring means 31. Although capable of a variety of alternate constructions, the embodiment detailed herein has been found to provide efficient and accurate results and, as a result, represents the preferred construction of the present invention.

In order to complete the construction of pressure measuring/monitoring gauge 20, a dial face or indicator plate 32 is mounted over cover plate 23 with a pointer 33 movably mounted to spinner or rotatable member 27. Finally, in order to prevent contamination of the components forming gauge 20, a transparent cover or lens 34 is mounted to housing 21 peripherally surrounding and enclosing the components forming gauge 20.

In carrying out the present invention, many alternate embodiments or alternate constructions can be employed. In one such construction, the information contained on dial face 32 can be formed on cover plate 30, thereby eliminating one component. In addition, bearings 28 may comprise other shapes, such as conical rollers, without departing from the scope of this invention. Although several other alternate constructions could be made, for purposes of explanation and disclosure, the preferred embodiment of the present invention is fully detailed herein, with some discussion provided regarding alternate embodiments.

As is evident from the following detailed disclosure, any movement of diaphragm 23 is immediately sensed by interface assembly 26, causing spinner or rotatable member 27 to arcuately pivot about its central axis in response thereto. With pointer 33 directly mounted to spinner 27, the arcuate movement of spinner 27 simultaneously causes pointer 33 to move arcuately, giving a visual indication to the user that the pressure has changed. In this way, an efficient, low-cost, pressure monitoring/measuring gauge is realized.

In accordance with the present invention, interface assembly 26 operates effectively to provide the desired measurements, while also being capable of being produced and assembled in an extremely low-cost manner. As a result, the construction detailed herein is preferred.

Figure 4:
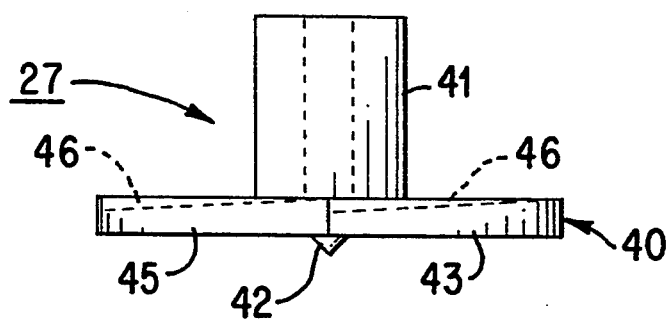
FIG. 4 is a side elevation view of the combined support plate and post which form one of the components of the interface/movement assembly of the present invention.
Figure 5:
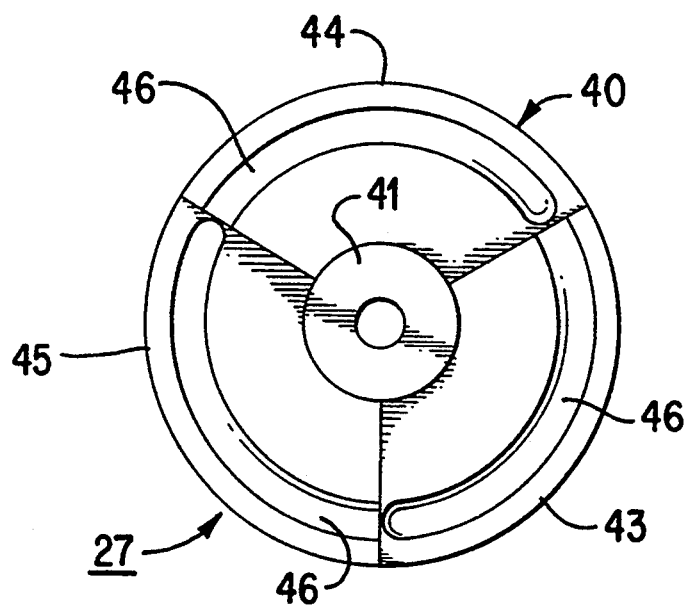
FIG. 5 is a top plan view of the support plate and post depicted in FIG. 4.

One component of interface assembly 26, which can be manufactured in a wide variety of alternate ways is spinner or rotatable member 27. As best seen in FIGS. 4 and 5, spinner 27 comprises a substantially circular plate 40, and an upstanding post 41, mounted on one side of plate 40, centrally disposed thereon and extending upwardly therefrom. A low friction pivot 42 is mounted on the opposed surface of plate 40 substantially coaxially with post 41.

In the preferred construction, plate 40 comprises three separate and independent segments 43, 44, and 45, with each segment incorporating an arcuately shaped, ramped or sloping track or groove 46. In addition, as depicted in FIG. 4, each arcuate groove 46 is constructed with a slope or ramp configuration which continuously extends more deeply into plate 40 as one moves from one end to the other end of groove 46.

Figure 6:
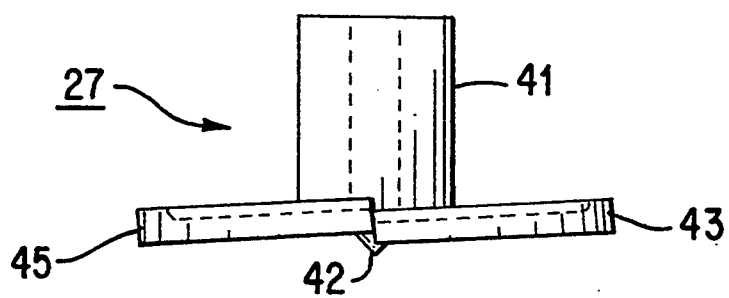
FIG. 6 is a side elevation view of an alternate embodiment for the combined support plate and post component.

In an alternate construction, shown in FIG. 6, ramped grooves 46 are attained by forming each groove 46 with the same depth throughout its entire length in the particular segment of plate 40. Then, each segment 43, 44 and 45 are separately arcuately bent to attain a resulting effect of having each groove 46 sloped relative to the remaining components of gauge 20. As shown in FIG. 6, segments 43 and 45 have been arcuately bent in the appropriate angular shape to attain the desired results.

In the preferred embodiment, spinner or rotating member 27 is mounted directly on diaphragm 23 so as to position spinner 27 in the most sensitive area of diaphragm 23 using low friction pivot means 42. Preferably, low friction pivot 42 comprises a small conical shaped member extending from support plate 40, the tip of which serves as the pivot point for spinner 27. In this way, any movement of diaphragm 23 is sensed by spinner 27.

The next component mounted to spinner 27 are spherical balls or bearings 28. In the preferred embodiment, three bearings 28 are employed, with one bearing positioned in each of the three grooves 46 formed in plate 40 of spinner 27.

Figure 3:
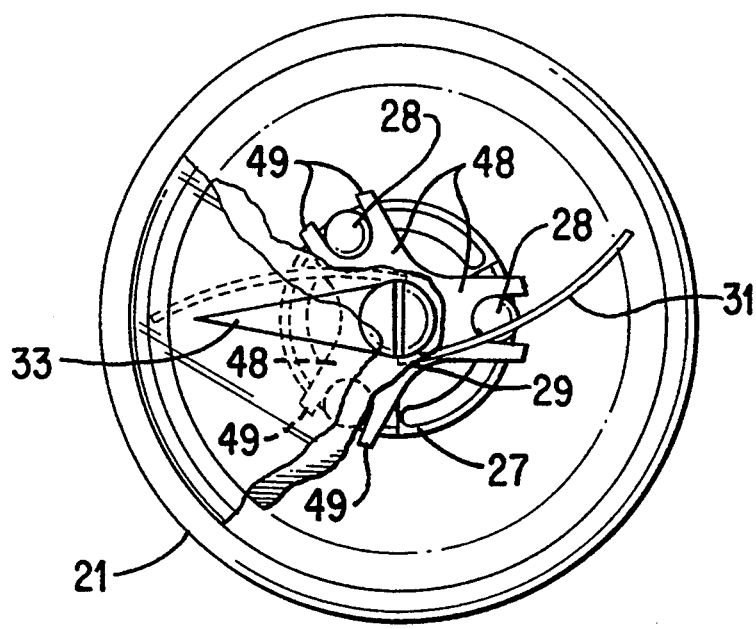
FIG. 3 is a top plan view of the gauge assembly of FIG. 1 with the lens, dial face and cover plate removed.

In order to securely retain bearings 28 in the desired position and assure that their movement along grooves 46 remains uninterrupted and coordinated, bearing spider 29 is preferably mounted about post 41. In its preferred construction, as shown in FIG. 3, bearing spider 29 comprises three radially extending arms 48, each of which terminate with bearing embracing fingers 49. When mounted in position, bearing spider 29 is able to rotate about post 41, with radially extending arms 48 and fingers 49 of bearing spider 29 partially surrounding and controllably engaging bearings 28. With bearing spider 29 rotatably mounted to post 41, bearings 28 are free to move within grooves 46 in a uniform and coordinated manner, while unwanted radially movement of bearings 28 out of grooves 46 is prevented by spider 29.

In order to retain bearings 28 in the desired position and provide a surface against which bearings 28 are rotated, interface assembly 26 comprises cover plate 31 which is mounted coaxially with upstanding post 41 of spinner 27 in overlying, contacting, retaining engagement with bearings 28. When in the desired position, cover plate 31 effectively sandwiches bearings 28 between one surface of cover plate 31 and grooves 46 of plate 40 of spinner 27.

The construction of interface assembly 26 is completed by mounting return spring 31 with post 41 of spinner 27 in a manner which counteracts the rotationally engaged movement of spinner 27 by diaphragm 23. In this way, continuing biasing return of spinner 23 to its normal position is provided. Although shown as a single biasing spring anchored with plate 31, spring means 31 may comprise a flat coiled spring or any other desired construction in order to maintain a biasing force on spinner 27 which will return spinner 27 to its original position, regardless of which direction spinner 27 rotates.

By employing the construction detailed above, a unique and highly effective interface assembly is realized which is capable of providing a pressure monitoring/measuring gauge which is easily manufactured and produced in a low cost and efficient manner. Once assembled, the gauge of the present invention is ready for long-term, dependable operation.

In operation, in order to provide the desired measuring and/or monitoring of the desired pressure level, movement/interface assembly 26 is mounted directly with diaphragm 23, with spinner 27 thereof positioned in direct contact with diaphragm 23. In this regard, low friction pivot 42 of spinner 27 is mounted directly on diaphragm 23. Whenever a pressure change is sensed, diaphragm 23 moves upwardly or downwardly in response thereto. This movement, for example when upwardly, causes spinner 27 to move upwardly therewith. However, in order for spinner or rotatable member 27 to move upwardly, ball bearings 28 and cover plate 30 must also move in the identical direction and to the same degree.

Due to the fixedly mounted construction of cover plate 30, any movement of spinner 27 as a result of movement of diaphragm 23 is prevented. Cover plate 30 is securely affixed to housing 21 effectively restraining and preventing ball bearings 28 and spinner 27 from moving in the manner detailed above. As a result, this axial motion cannot be attained.

Instead, the axial forces generated by the movement of diaphragm 23 cause spinner or rotatable member 27 to arcuately rotate about its central axis while bearings 28 rollably advance along the shaped or ramped grooves 46 within which bearings 28 are securely retained. With spinner 27 being mounted to diaphragm 23 with a low friction pivot 42, the arcuate, rotatable movement of spinner 27 in response to the vertical forces is the only resulting movement attainable by spinner 27 in order to accommodate the forces being received.

If desired, the ramped grooves or tracks may be formed in the cover plate, with the support plate being substantially flat. The only requirement is that one of these components, or its equivalent, must comprise the ramped grooves or tracks for enabling the bearing to roll in response to the diaphragm's movement.

In addition, although three separate grooves or tracks have been shown with each track spaced away from the central axis by substantially the same distance, the tracks or groove can be formed with any desired length with the tracks being concentrically arranged relative to each other. In this way, any desired arc of rotation can be easily achieved, thereby enabling any degree of sensitivity to be attained.

As is evident from the foregoing detailed discussion, large pressure changes cause diaphragm 23 to move to a greater extent which simultaneously causes spinner 27 to rotate to a greater degree. Consequently, large pressure changes cause pointer 33 to move to a greater extent while small pressure changes causes pointer 33 to move to a lesser extent. However, by employing this construction, the pressure changes recognized by diaphragm 23 are immediately and directly converted to a visual indication by interface/movement assembly 26. In this way, a low cost, easily assembled, and highly effective gauge is realized.

One of the inherent drawbacks found with diaphragm pressure monitoring systems has been the limitation that the diaphragm does not move in direct proportional response to the pressure change being sensed. Typically lower or initial pressure changes cause the diaphragm to move to a greater extent while pressure changes of a similar magnitude, but greater in amount, will cause diaphragm 23 to move to a lesser extent. As a result, diaphragm systems tends to be most sensitive at the lower or initial pressure changes than they are at subsequent or higher pressure level changes.

By employing the present invention, this inherent difficulty can be easily accommodated and an accurate pressure gauge assembly can be produced which is capable of compensating for the inherent drawbacks of diaphragm systems. By forming grooves 46 in plate 40 with a varying slope or ramp angle, the movement of bearings 28 in grooves 46 of plate 40 can be controlled to produce a smaller arc of rotation for spinner 27 in its initial movement, while providing a large arc of rotation for spinner 27 as bearings 28 advance further along groove 46. In this way, the tendency of diaphragm 23 to move a greater extent initially and a smaller extent subsequently can be accommodated with pointer 33 providing a substantially accurate, consistent movement properly reflecting the actual pressure change, as opposed to the movement of diaphragm 23. If an intentional non-linearity is desired, such as in an expanded mid-range construction, this, too, is easily accomplished by shaping the tracks appropriately.

As detailed above, movement/interface assembly 26 is mounted in housing 21 in cooperating interengagement with diaphragm 23. As is evident from this disclosure, housing 21 may comprise numerous alternate constructions. For purposes of simplicity and reduced cost, the embodiment detailed above shows housing 21 as being formed from the interlocking interengagement of a diaphragm holding plate and the cover plate 30. By forming the outer peripheral edges of cover plate 30 and diaphragm holding plate in overlying, locked interengagement, a low cost, easily manufactured housing is realized. However, any desired alternate construction can be used with equal efficacy.

As is apparent from the foregoing detailed disclosure, an extremely efficient, low-cost, easily assembled, minimum component gauge construction is attained by the present invention. Although the preferred embodiments have been detailed herein, alternate constructions can be made which employ the present invention. Consequently, the detailed disclosure is intended as exemplifying the best mode for the present invention, without limiting the scope of this invention thereto.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A measuring instrument comprising
   A. a housing;
   B. condition level input means extending from the housing and constructed for cooperative interengagement with a source;
   C. a sensing element mounted in the housing in cooperative association with the condition level input means and positioned for movement in a first direction in response to changes in the condition level input means; and
   D. a movement/interface assembly
      a. mounted in the housing in cooperating association with the sensing element for monitoring the movement of the sensing element;
      b. providing a visual indication corresponding to any movement of the sensing element sensed thereby; and
      c. comprising a captured roller construction for directly converting the movement of the sensing element into rotary motion proportional to the movement of the sensing element and having an axis of rotation parallel to the first direction thereof;
   whereby a measuring instrument constructed with a minimum of parts and an optimum level of accuracy is attained.

2. The measuring instrument defined in claim 1, wherein said movement/interface assembly is further defined as comprising a plurality of rollers separately mounted in ramped tracks and sandwiched between two roller holding plates positioned in juxtaposed, spaced, facing relationship to each other with one of said plates being constructed for rotational movement about its central axis in response to the receipt of an input force causing the roller to advance along the ramped tracks.

3. The measuring instrument defined in claim 2, wherein the roller construction of the movement/interface assembly is further defined as comprising
   1. a first support plate constructed for mounted engagement with the sensing element and rotational movement relative thereto and incorporating an upstanding post integrally formed therewith and extending from one surface of said plate and a low friction pivot member coaxially aligned with the upstanding post and extending from the opposed surface of the support plate for contacting engagement with the sensing element,
   2. a second support plate fixedly mounted in the housing and positioned in juxtaposed, spaced, cooperating relationship with the first support plate,
   3. a plurality of arcuately shaped, ramped tracks formed in one of said support plates in a surface thereof facing the other surface of the support plate, and
   4. a plurality of rollers independently mounted in each of said arcuately shaped, ramped tracks, whereby any movement of the sensing element causes an axial force to be received by the first support plate and post member, causing the rollers to rollingly advance along the ramped tracks within which each roller is retained, simultaneously causing the first plate to rotate about its central axis.

4. The measuring instrument defined in claim 3, wherein said roller construction of the :movement/interface assembly is further defined as comprising a roller holding spider rotationally mounted to the upstanding post of the first support plate and comprising a plurality of radially extending arms each terminating with roller engaging fingers for surrounding and guiding said rollers, whereby simultaneous, coordinated movement of all of the rollers is assured.

5. The measuring instrument defined in claim 3, wherein said plurality of arcuate tracks are further defined as being formed in the first support plate and each of said tracks is further defined as comprising a slope or pitch constructed to produce a desired arc of rotation of said first support plate in response to a particular input force.

6. The measuring instrument defined in claim 3, wherein said first support plate is further defined as comprising a plurality of separate, independent, arcuate sections.

7. The measuring instrument defined in claim 6, wherein one arcuately shaped, ramped track is formed in each arcuate section forming the first support plate.

8. The measuring instrument defined in claim 6, wherein each arcuately shaped track comprises a substantially uniform depth throughout and each section is independently twisted relative to the upstanding post for establishing a ramped, sloping track.

9. The measuring instrument defined in claim 3, wherein each of the arcuately shaped, ramped tracks are further defined as comprising a slope angle or pitch specially constructed for imparting varying arcs of rotation of the first support plate for similar input forces.

10. The measuring instrument defined in claim 3, wherein said movement/interface assembly further comprises
    d. a pointer fixedly mounted to the upstanding post of the first support plate for arcuate movement therewith, whereby said pointer provides a visual indication to the user which corresponds to the change being sensed by the sensing element.

11. The measuring instrument defined in claim 10, wherein said movement/interface assembly further comprises a dial face positioned between the pointer and the second support plate for providing an easily viewable surface for visually observing changes and movement of the pointer.

12. The measuring instrument defined in claim 3, wherein said movement/interface assembly further comprises
    d. biasing spring means mounted to the post of the first support plate for providing a continuous biasing force to the first support plate to return the first support plate to its original position.

13. A pressure monitoring/measuring gauge comprising
    A. a housing;
    B. a pressure level inlet extending from the housing and constructed for cooperative interengagement with a pressure source;
    C. a diaphragm mounted in the housing in cooperative association with the pressure level inlet and positioned for axial movement in response to pressure changes in the inlet; and D. an interface assembly
  a. mounted in the housing in contacting engagement with the diaphragm for monitoring the movement of the diaphragm;
  b. providing a visual indication corresponding to any axial movement of the diaphragm sensed thereby; and
  c. comprising a captured roller construction for directly converting the axial movement of the diaphragm into rotary motion
    (1). proportional to the axial movement of the diaphragm, and
    (2). having an axis parallel to the axial movement of the diaphragm;

whereby a pressure monitoring/measuring gauge constructed with a minimum of parts and an optimum level of accuracy is attained.

14. The pressure monitoring/measuring gauge defined in claim 13, wherein said interface assembly is further defined as comprising a plurality of rollers separately mounted in ramped tracks and sandwiched between two roller holding plates positioned in juxtaposed, spaced, facing relationship to each other with one of said plates being constructed for rotational movement about its central axis in response to the receipt of an axial input force causing the roller to advance along the ramped tracks.

15. The pressure monitoring/measuring gauge defined in claim 14, wherein the roller construction of the interface assembly is further defined as comprising
1. a first support plate constructed for mounted engagement with the diaphragm and rotational movement relative thereto and incorporating an upstanding post integrally formed therewith and extending from one surface of said plate and a low friction pivot member coaxially aligned with the upstanding post and extending from the opposed surface of the support plate for contacting engagement with the diaphragm,
2. a second support plate fixedly mounted in the housing and positioned in juxtaposed, spaced, cooperating relationship with the first support plate,
3. a plurality of arcuately shaped, ramped tracks formed in one of said support plates in a surface thereof facing the other surface of the support plate, and
4. a plurality of rollers independently mounted in each of said arcuately shaped, ramped tracks, whereby any movement of the diaphragm causes an axial force to be received by the first support plate and post member, causing the rollers to rotationally advance along the ramped tracks within which each roller is retained and simultaneously causing the first plate to rotate about its central axis.

16. The pressure monitoring/measuring gauge defined in claim 15, wherein said roller construction of the interface assembly is further defined as comprising a roller holding spider rotationally mounted to the upstanding post of the first support plate and comprising a plurality of radially extending arms each terminating with roller engaging fingers for surrounding and guiding said rollers, whereby simultaneous, coordinated movement of all of the rollers is assured.

17. The pressure monitoring/measuring gauge defined in claim 14, wherein said plurality of arcuate tracks are further defined as being formed in the first support plate and each of said tracks is further defined as comprising a slope or pitch constructed to produce a desired arc of rotation of said first support plate in response to a particular input force.

18. The pressure monitoring/measuring gauge defined in claim 14, wherein said first support plate is further defined as comprising a plurality of separate, independent, arcuate sections.

* * * * *